March 25, 1952     E. A. VOLK, JR     2,590,482
ENERGY ABSORBING STOP
Filed July 11, 1947
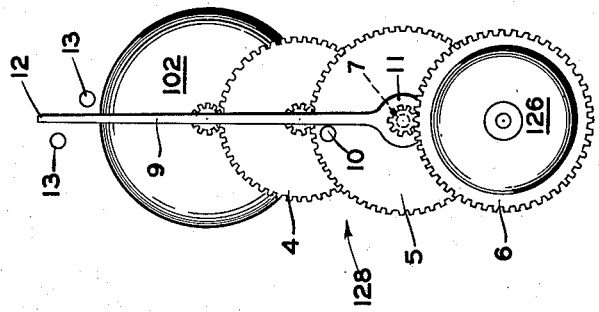
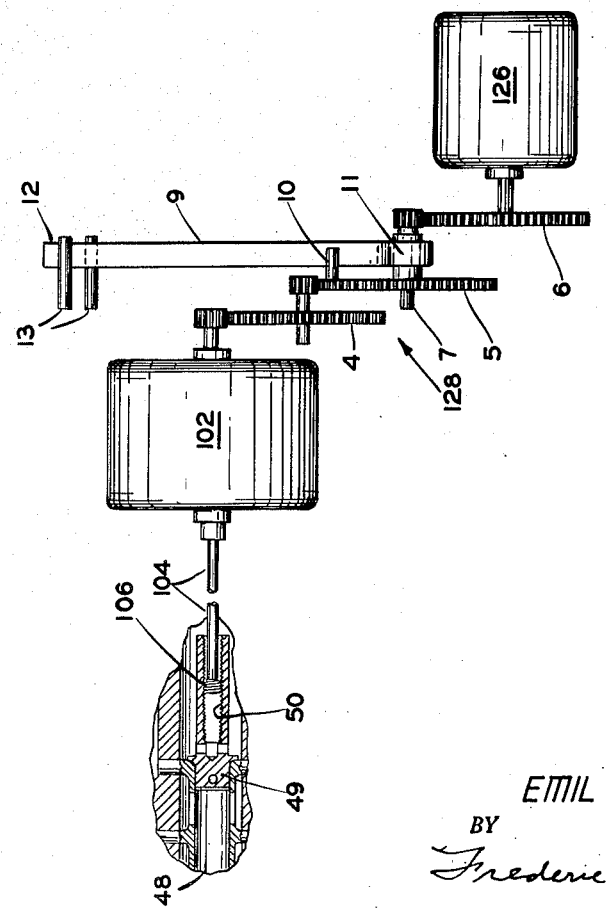
INVENTOR.
EMIL A. VOLK JR.
BY
Frederic H. Miller
—ATTORNEY—

Patented Mar. 25, 1952

2,590,482

UNITED STATES PATENT OFFICE 2,590,482

ENERGY ABSORBING STOP

Emil Albert Volk, Jr., Hasbrouck Heights, N. J., assignor to Bendix Aviation Corporation, Teterboro, N. J., a corporation of Delaware Application July 11, 1947, Serial No. 760,363

4 Claims. (Cl. 192—138)

This invention relates to stops and particularly to an energy absorbing stop adapted for operation in a servo unit, as of the electro-hydraulic type.

Certain servo units have exacting requirements as to weight, size and complication of structure, whereby they may not unduly encumber an aircraft, which may require several such units, and whereby they may be dependable and effective under all conditions of service.

It is an object of the present invention to provide a novel stop means which is adapted to a servo unit of the indicated character without appreciably altering the requirements above set forth.

Another object is to minimize the required stopping force and therefore the shock caused by motor inertia.

Another object is to provide stop means, the operating range of which may be readily predetermined.

Another object is to provide stop means of the above-indicated character which is simple and durable in construction, economical to manufacture, and effective in its operation.

The above and other objects and features of the invention will appear more fully hereinafter from a consideration of the following description taken in connection with the accompanying drawing wherein one embodiment of the invention is illustrated by way of example.

In the drawing:

Figure 1 is a structural diagram of a device embodying the invention; and

Figure 2 is an end view taken from the right of Figure 1.

The drawing illustrates portions of a servo unit with which the invention is adapted to cooperate and which comprises a valve 48 including an end plug 49 having an internal screw 50, a screw jack 106 for the screw 50 and disposed on a shaft 104 of a reversible motor 102, a gear train 128, including gears 4, 5 and 6, stops 13 and a resilient arm 9, and a follow-up synchro 126 connected to the motor through the train 128.

The motor 102 drives the shaft 104 and also turns reduction gears 4, 5 and 6 of the train 128, gear 6 being fixed to the synchro 126.

A pin 10 on the gear 5 is stopped by the arm 9 when the servo pilot valve 48 is at either limit of its travel. One end 11 of the arm 9 is relatively pivotally mounted on a shaft 7 of the gear 5 and its other end 12 is located between the two stop pins 13 to abut either of the latter at the respective limits of the pin movement.

An advantage is that the pin 10 moves through nearly 360° for the operating range and hence minimizes the required stopping force. The mounting of the spring arm 9 provides utmost resistance and hence tends to minimize the stopping shock caused by motor inertia. Further, the operating range is readily predetermined by changing the ratios of the gears 4, 5 and 6.

The invention thus comprises, in a device comprising the valve member 48 linearly movable oppositely within given limits, rotatable driving means in the form of the shaft 104 for the member 48, and a gear train 128 connected to the driving means 104 including an oppositely rotatable element or gear 5 rotatable through substantially one revolution in each direction while the member 48 moves in a corresponding direction between its limits, the combination of the resilient arm 9 pivoted about the axis of and relative to the element 5, the stop means 13 outwardly along the arm 9 from the latter axis preventing rotation of the arm 9 about the axis, and the means 10 carried by the element 5 adapted to engage the arm 9 at positions between the arm axis and the stop means 13 at opposite sides of the arm 9.

Although only one embodiment of the invention has been illustrated and described, various changes in the form and relative arrangements of the parts may be made to suit requirements.

What is claimed is:

1. In a device comprising a member linearly movable oppositely within given limits, rotatable driving means for said member, and a train of gears connected to said driving means including on oppositely rotatable element rotatable through substantially one revolution in each direction while said member moves in a corresponding direction between said limits, the combination of a resilient arm pivoted about the axis of and relative to said element, said resilient arm extending substantially along the axis of symmetry of said member, driving means and gears, stop means outwardly of said arm and substantially along the axis of symmetry so as to prevent rotation of the arm about the axis of said element, and means carried by said element adapted to engage said arm substantially along said axis of symmetry and at positions between the axis of said element and said stop means, and said stop means being arranged at opposite sides of the arm.

2. In a device comprising an oppositely rotatable element rotatable through substantially one revolution in each direction, a motor, a train of gears including said element drivably connected to said motor, a rotatable mechanism, said train of gears to drivably connect said motor to said mechanism, a shaft through the center of each gear, a resilient rod pivoted at one end on one of said shafts and extending substantially along the axis of symmetry of said train of gears, element and mechanism, a fixed stop on either side of said rod at the opposite end thereof, a pin on one of said gears adapted to engage said rod intermediate the opposite ends thereof to limit the rotation of said element, train of gears and mechanism.

3. In combination a reversible motor, a rotatable shaft, a gear train connecting said motor to said shaft whereby the former rotates the latter in either of two directions, a resilient arm having one end thereof pivotally mounted on said shaft, said resilient arm extending substantially along the axis of symmetry of said gear train, stop means outwardly of said resilient arm and disposed on opposite sides thereof for maintaining said arm substantially on the axis of symmetry, and means carried by one of the gears of said gear train and engageable with said resilient arm whereby the rotation of said shaft is limited to substantially one revolution in either direction.

4. In combination a reversible motor, a rotatable shaft, a gear train including a gear mounted on said shaft for connecting said motor to said shaft whereby the former rotates the latter in either of two directions, a resilient arm having one end thereof pivotally mounted on said shaft, said resilient arm extending substantially along the axis of symmetry of said gear train, stop means outwardly of said resilient arm and disposed on opposite sides thereof for maintaining said arm substantially on the axis of symmetry, and means carried by the gear mounted on said shaft and engageable with said resilient arm whereby the rotation of said shaft is limited to substantially one revolution in either direction.

EMIL ALBERT VOLK, Jr.

REFERENCES CITED

The following references are of record in the file of this patent:

UNITED STATES PATENTS

| Number | Name | Date |
|---|---|---|
| 2,372,096 | Lessmann et al. | Mar. 20, 1945 |
| 2,410,695 | Werner | Nov. 5, 1946 |
| 2,488,122 | Griffith | Nov. 15, 1949 |